(12) United States Patent
Müller

(10) Patent No.: US 6,460,839 B2
(45) Date of Patent: Oct. 8, 2002

(54) AIR DAMPER FOR A MOVABLY SUPPORTED STRUCTURAL PART, IN PARTICULAR IN AUTOMOBILES

(75) Inventor: Hans-Günther Müller, Würzburg (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/847,428

(22) Filed: May 3, 2001

(65) Prior Publication Data
US 2001/0038174 A1 Nov. 8, 2001

(30) Foreign Application Priority Data
May 4, 2000 (DE) ........................ 100 21 762.1

(51) Int. Cl.$^7$ ................ F16F 9/02; F16F 1/06; F16F 9/32; F16F 7/00
(52) U.S. Cl. .............. 267/221; 92/169.1; 92/171.1; 16/66; 16/84; 188/322.19; 188/322.18; 267/202; 267/124
(58) Field of Search .............. 267/221, 226, 267/120–129, 64.11–64.28, 134, 201–203, 166.1, 288, 33, 69–74; 188/322.22, 322.18, 322.17, 129, 381, 322.19, 322.13, 322.16, 269; 16/66–70, 84, 85; 92/171.1, 169.1, 165 R, 168; 277/565, 29, 165

(56) References Cited

U.S. PATENT DOCUMENTS

| | | | |
|---|---|---|---|
| 4,077,619 A | * | 3/1978 | Borlinghaus |
| 4,342,447 A | | 8/1982 | Marx |
| 4,707,882 A | | 11/1987 | Watts |
| 4,808,323 A | | 2/1989 | Fisher et al. |
| 4,856,625 A | * | 8/1989 | Oshida .............. 16/66 |
| 5,127,497 A | * | 7/1992 | Struckmeyer et al. . 188/322.17 |
| 5,165,324 A | * | 11/1992 | Maruoka .............. 92/171.1 |
| 5,310,167 A | * | 5/1994 | Noll, Jr. .............. 267/33 |
| 5,471,708 A | | 12/1995 | Lynch |
| 5,697,477 A | * | 12/1997 | Hiramoto et al. ...... 188/322.18 |
| 6,062,352 A | * | 5/2000 | Shinozaki et al. ...... 188/322.16 |
| 6,119,832 A | * | 9/2000 | Hofmann .............. 16/66 |
| 6,199,673 B1 | * | 3/2001 | Wach ................ 188/322.18 |
| 6,220,583 B1 | * | 4/2001 | Ito .................. 267/226 |

FOREIGN PATENT DOCUMENTS

| | | |
|---|---|---|
| AU | 544 943 | 6/1985 |
| DE | 43 19 641 | 12/1993 |
| DE | 295 18 171 | 1/1996 |
| DE | 295 20 787 | 4/1996 |
| DE | 295 21 309 | 12/1996 |
| FR | 2 666 857 | 3/1992 |
| GB | 2 302 929 | 2/1997 |

OTHER PUBLICATIONS

Derwent Publications Ltd., No. XP002173758 and Japan Synthetic Rubber Co. Ltd., No. JP 05 230436, filed Sep. 7, 1993 *Abstract*.

* cited by examiner

*Primary Examiner*—Douglas C. Butler
(74) *Attorney, Agent, or Firm*—Lowe Hauptman Gilman & Berner, LLP

(57) ABSTRACT

An air damper for a movably supported structural part in automobiles comprises a hollow cylinder closed at one end thereof, a closure cap mounted on the other end of the cylinder, a piston slidably guided within the cylinder, an annular recess at the circumference of the piston, and an annular sealing ring in the recess. The block-like sealing ring is made of a thermoplastic elastomer coated with a layer which has the same static and sliding frictions with the inner wall of the cylinder and the bottom of the recess. A coil spring is placed between the closure cap and the piston. A piston rod of the piston has an elongated rib contacting the spring when the spring is in a relieved state.

29 Claims, 3 Drawing Sheets

AIR DAMPER FOR A MOVABLY SUPPORTED STRUCTURAL PART, IN PARTICULAR IN AUTOMOBILES

FIELD OF THE INVENTION

The invention relates to an air damper for a movably supported structural part, in particular in automobiles.

BACKGROUND OF THE INVENTION

Air dampers of this type have become known, for example, from DE 295 18 171 or DE 43 19 641. The retardation in the piston motion is produced by means of an overflow duct which is defined in an annular groove or annular recess of the piston. A sealing ring is seated in the recess with the axial extension of the sealing ring being smaller than that of the recess. Thus, the sealing ring slides to either of the walls of the recess during the reciprocating motion of the piston. The walls of the recess have grooves so that air may flow from one side of the piston to the other. If the grooves in the bottom and walls of the recess are given appropriate dimensions the throttling effect may be different to achieve different damping efficiencies in the respective directions of displacement.

It is necessary to reach harmonization between the speed at which the piston is displaced and the cross-sectional area or length of the overflow duct. If this is not the case intermediate stoppages may occur during its motion. The structural part oscillates stepwise to the final stop while "nodding". This problem is even aggravated if the force acting onto the air damper is of a differing magnitude. The best behaviour is obtained if cylinder diameters are large. However, the space required frequently does not exist.

It is also known to provide such air dampers with a tension spring or compression spring which is arranged between a closure of the cylinder and the piston. Both the air damper itself, whether with a spring or without a spring, constitutes an oscillation system which opposes a soft damping action. In addition, the spring forms a potential source of noise.

SUMMARY OF THE INVENTION

It is the object of the invention to provide an air damper which produces an efficient ritardation even if accelerations are higher, and does not constitute an oscillation system. Furthermore, the generation of noise is intended to be minimized in the air damper.

This object is attained by the features of the inventive air damper.

The inventive air damper forms a block-like sealing ring made of a thermoplastic elastomer which cooperates with the wall of the cylinder with a predetermined compression force. The sealing ring is coated with a suitable layer which gives the sealing ring a sliding property which produces approximately the same value whether a static friction exists or a sliding friction. In other words, the sealing ring essentially has no breakaway torque. Therefore, so-called stick-slip effects which result in noise generation do not occur. In fact, it is imaginable to achieve uniform friction by the use of lubricants. Lubricants, however, are of different viscosities depending on temperature. In addition, there is a risk that the overflow duct would be reduced in size or would even be occluded by the lubricant. Likewise, lubricants are undesirable if the air brake is employed in the visual range because there is a hazard of contamination.

The inventive air damper helps attain a uniform friction which essentially does not depend on temperature, with the Shore hardness which changes with temperature only having a minimal impact on friction. Thus, there are two factors that influence the damping behaviour and the damping rate of the air damper, which are the pressure difference between the separated cylinder spaces and friction.

Any oscillations that might occur are smoothened by friction, which also needs to be overcome when the air damper requires to be displaced. To make it possible to produce a determined friction the sealing ring has to be a moulded ring which is subjected to a certain compressive force. Such force, however, should be reproducible independently of temperature. In such a case, an undesirable oscillation behaviour does not occur, nor will undesirable noise be generated.

The coating which is used for the sealing ring in this case and which will satisfy the requirements is a polymer coating based on polysiloxanes. The ring is made of a material which has a permanent compression set even at high temperatures.

It frequently happens that the displacement force produced via the air damper is intented to be larger in one direction than it is in the other. This can be done by means of a spring. As an alternative or in addition, according to an aspect of the invention, the bottom of the recess may be conically formed. In this way, a compressive force which is differently high depending on the location of the sealing ring and, hence, differently high friction is produced in the recess.

A coil spring which is intended to impart a preferred direction of displacement to the cylinder may be arranged in the cylinder or outside it. A coil spring, when arranged in the cylinder, may cause some problems. First and foremost, the spring is a source of noise. Thus, a knocking noise might be heard if the air damper is jarred at a quiet travel. The spring starts oscillating while knocking against the piston rod or cylinder wall. A compression spring is relatively instable and, when actuated, rapidly gets at its buckling point. At this point, the spring tends to move away to one side. It also might knock against the piston rod or cylinder wall. In addition, friction noise or whizzing noise may be produced. When the piston rod is actuated friction noise is produced between the shank and turns of the spring. The effect is heavier if surfaces are rough and the spring starts whizzing, which makes itself felt as a squeaking noise.

In order to tackle the problem described, an aspect of the invention provides that the piston rod has formed thereon elongate ribs by which the turns of the spring are engaged if these are relieved. It should be noted here that the spring undergoes an enlargement of the turn diameter essentially in the middle region if the spring is compressed whereas its final turns essentially remain as they were before. However, if the end of the spring also is moved relative to the piston rod care should be taken not to have a clear engagement between the turn of the spring and the piston rod even in the relieved condition. At this point, what requires to be taken into account are the tolerances in manufacturing the piston rod and also the spring. Therefore, it is recommended that although the ribs should extend along the piston rod over a major length the final turns of the spring should not be in engagement with any such rib.

According to the invention, another improvement is that the coil spring is necked down and only the necked portion engages the ribs. It is only the closer-wound middle turns of the spring which engage the whizz removal ribs which, for the rest, may also be made flexible in order to accommodate a major overlap of the turns. For example, this may be accomplished by means of elongate through openings. It is preferred that the spring is of a symmetrical shape so that it does not matter in which position it is slid onto the piston rod.

According to another aspect of the invention, the spring wire is provided with a plastic coating. Preferably, the spring is wound from a plastic coated spring wire. This helps obtain a good sliding effect between the spring and the whizz removal ribs.

Friction noise and rattle noise may also be produced in the guide region between the lid and the piston shank. For clearance reduction, the lid or closure may be provided with suitable spring portions which prevent a rattle noise. In order to reduce friction and the noise that it causes the spring portion ends engaging the surfaces of the piston rod can be ball-shaped.

BRIEF DESCRIPTION OF THE DRAWINGS

The invention will now be explained in detail with reference to embodiments shown in drawings.

DETAILED DESCRIPTION OF THE INVENTION

Figure 1:
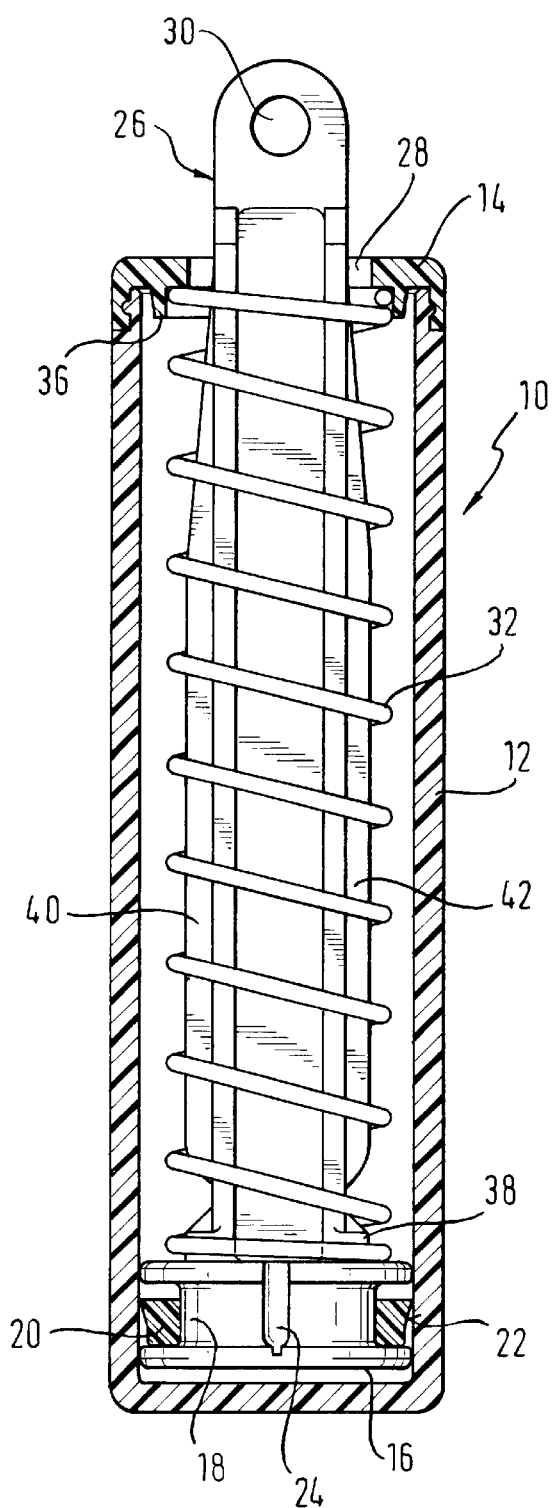
FIG. 1 schematically shows the first embodiment of an inventive air damper.

Referring to FIGS. 1 through 4, an air damper generally is designated by 10. It has a cylinder 12 which can be closed at the lower end and can be closed by a lid 14 at the upper end which is open. The lid 14 is seated on the cylinder 12 by means of a snap connection (not numbered) with either element formed from a plastic material. Housed in the cylinder is a piston 16 which has a relatively wide annular groove 18 and 18a. The annular groove has seated therein a block-like sealing ring 20. The block-like sealing ring 10 is cylinder on its inside and is cylindrical in a portion of its outside and is conical in its portion 22 so that it causes some sort of a lip to bear on the wall of the cylinder 12. The sealing ring 20 is arranged between the bottom of the groove 18 and 18a and the wall of the cylinder under a certain contact force so as to produce a certain frictional force. The sealing ring 20 has been treated with a polymer coating on a polysiloxane basis, which ensures that no breakaway torque needs to be overcome if the piston 16 is to be displaced. Moreover, the material of the sealing ring, which is the thermoplastic polymer, has been selected so that a high compression continues to exist set even at high temperatures.

The bottom and the wall of the circular groove 18 and 18a have formed therein a bridge duct 24 over which air can pass if the piston 16 is displaced in the cylinder 12. Such an arrangement of a bridge duct, for example, has become known from DE 43 19 641 or DE 295 18 171.

Figure 2:
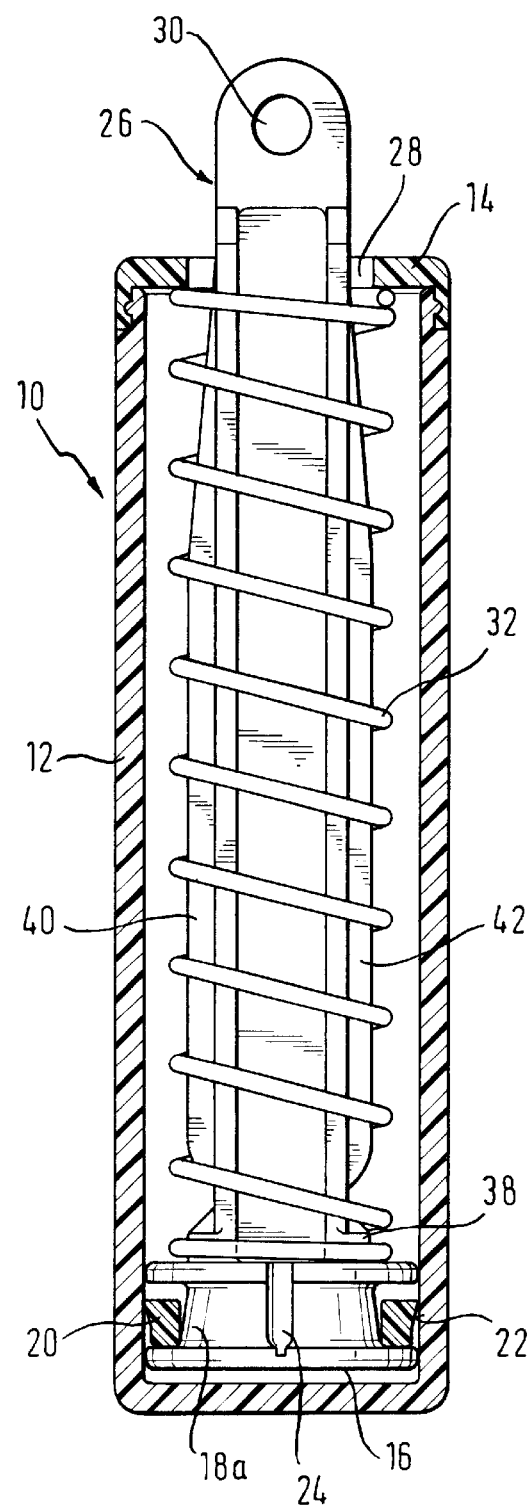
FIG. 2 schematically shows a second embodiment of an inventive air damper.

As can be seen from FIG. 2 the bottom of the annular groove 18a is conical. Thus, the contact force decreases and so does friction if the sealing ring is displaced from the position shown in FIG. 2 to a position in which it comes to bear on the opposite wall of the groove. In this way, the displacement force required differs, depending on the direction of displacement of the piston 16.

The piston 16 is provided with a piston rod 26 which is passed out of the lid 14 through an opening 28 and is fitted with an eyelet 30 for connection, for example, to a structural part which needs to be actuated, e.g. a flap of a glove compartment or the like whereas the cylinder 12 is connected to a part fixed to the vehicle. The connection to these parts may also be made inversely. It is also possible to dampen other parts in the automobile. For example, the piston rod 26 can be double-T-shaped or rectangularly shaped or be of a K shape or circular shape in cross section, which fact is not shown in detail in FIGS. 1 through 4. FIG. 5 shows a double-T shape, for example. A coil spring 32 is arranged between the lid 14 and the surface of the piston 16 which faces it. The spring is shown in a relieved condition in FIGS. 1 through 4. In FIG. 1, the underside of the lid has formed thereon at least one ring-like protrusion 36 which surrounds the uppermost turn of the spring 32 by bordering it. The lowermost turn of the spring 32 is outside an axial shoulder 38 of the piston 16, which causes the spring 32 to be laterally located at this point. Two diametrically opposed whizz removal rockers 40, 42 are formed parallel to the axis on the piston rod 26 in the embodiment of FIGS. 1 and 2. The whizz removal rockers 40, 42 extend along a large length within the spring 32, but reduce their width towards the lid 14 in the upper third. The respective turns of the spring 32, when in their relieved position of FIGS. 1 and 2, bear on the ribs 40, 42 nearly in a no-force contact. In this way, the spring 32 is prevented from oscillating or buckling sidewards when under a compression. By the way, the material of the spring 32 is provided with an easily slidable plastic coating so that a contact between the turns of the spring and the ribs 40, 42 essentially does not produce friction. This avoids any squeak or whizz of the turns of the spring.

Figure 3:
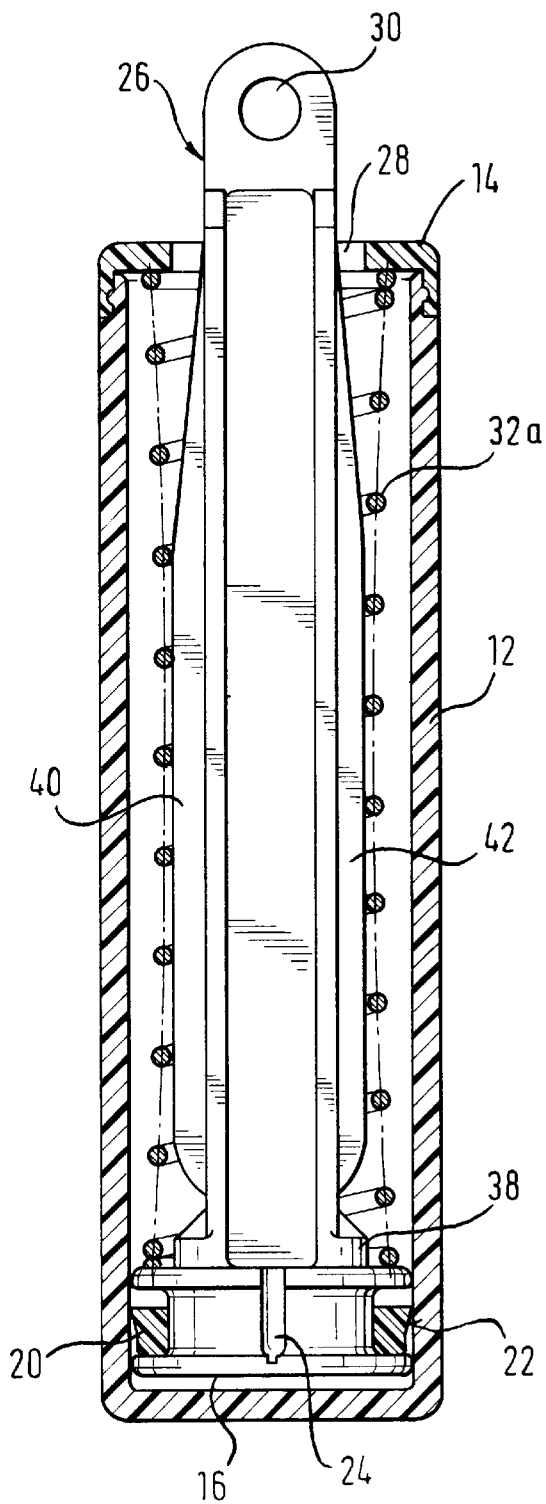
FIG. 3 schematically shows a third embodiment of an inventive air damper.

The embodiment of FIG. 3 is distinguished from the one of FIG. 2 by the fact that the spring 32a is not of a cylindrical shape, but is of a necked down shape. Thus, only the middle turns of the symmetrically designed spring 32a will bear on the whizz removal ribs 40, 42.

Figure 4:
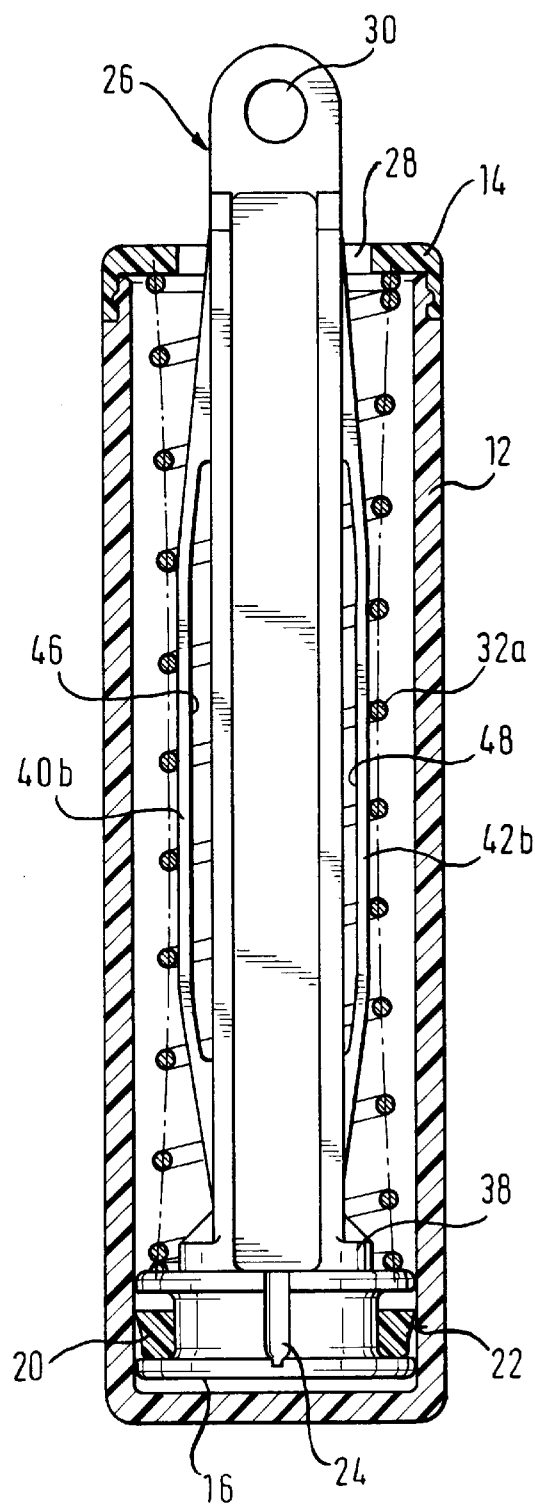
FIG. 4 schematically shows a fourth embodiment of an inventive air damper.
Figure 5:
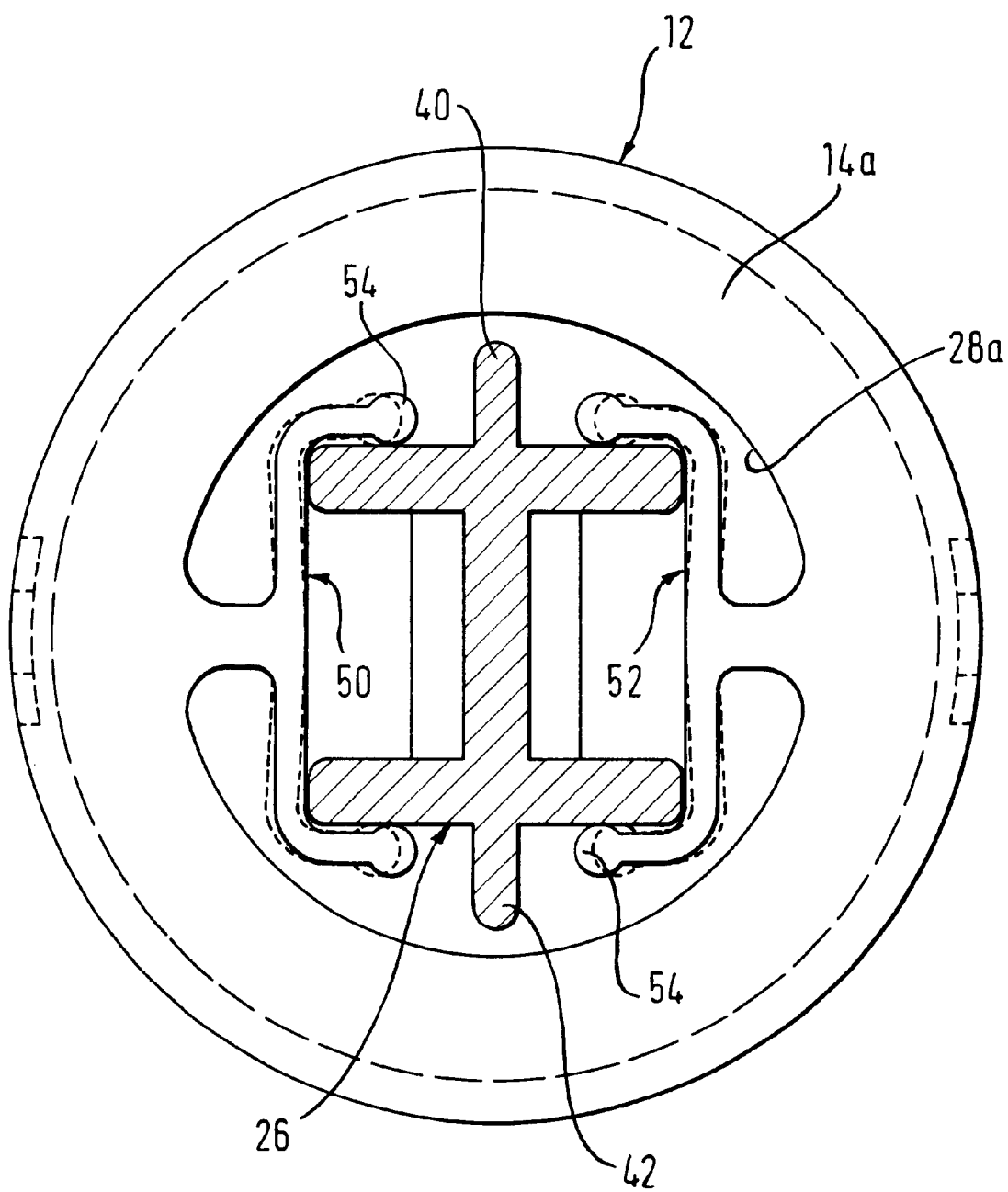
FIG. 5 shows an end view of the inventive air damper with a special lid.

The peculiar characteristic of the embodiment of FIG. 4 is that the whizz removal rips 40b, 42b are flexibly formed by an axially parallel through opening 46 and 48 in a radial direction. The outer contour of the ribs 40b, 42b corresponds to the one of the ribs 40, 42 of the previously described embodiments.

This allows to accommodate a larger field of spring action tolerance with no risk of the overlap and, hence, the friction of the spring becoming too large on the ribs.

In FIG. 5 illustrates the upper end of a cylinder 12 for an air damper which corresponds to the one of FIGS. 1, which damper is closed by a lid 14a here. The piston rod 26 is double-T-shaped and has diametrically opposed whizz removal ribs 40, 42 which correspond to those of the embodiments of FIGS. 1 to 3. The edge of the opening 28a has formed thereon U-shaped spring portions 50, 52 including appropriate legs which grip the cross-webs of the double-T shape from outside. The ends of the spring portions are ball-shaped as is shown at 54. The spring members 50, 52 help in guiding the piston rod 26 so that rattle noise is avoided between the piston rod and the edge of the opening. Because of the ball-shaped bearing portions 54, this region only produces little friction.

What is claimed is:

1. An air damper for a movably supported structural part in automobiles, said air damper comprising:

a hollow cylinder (12) closed at one end thereof;

a closure cap (14, 14a) mounted on the other end of the cylinder (12);

a piston (16) slidably guided within the cylinder and having a rod (26) extending outwardly of the cylinder through the cap (14, 14a);

an annular recess at the circumference of the piston (16);

an annular sealing ring (20) in the recess which sealingly engages the inner wall of the cylinder (12) and the bottom of the recess, the axial extension of the sealing ring being smaller than that of the recess (18, 18a);

at least one axial groove in the bottom of the recess (18, 18a) and at least one radial groove in the walls of the recess which communicate with the axial groove, with the cross section of the axial groove changing from one wall of the recess to the other wall;

wherein the sealing ring is block-like and made of a thermoplastic elastomer, the sealing ring being coated with a layer which has approximately equal static and sliding frictions with the inner wall of the cylinder and the bottom of the recess.

2. The air damper of claim 1, wherein the sealing ring is coated with a polymer on the basis of polysiloxane.

3. The air damper of claim 1, wherein the material of the sealing ring (20) has a high compression set at high temperatures.

4. The air damper of claim 1, wherein the bottom of the recess (18i a) is conically formed.

5. The air damper of claim 1, wherein an inner edge of the opening of the closure cap is provided with resilient portions engaging the piston rod.

6. An air damper, comprising:

a hollow cylinder closed at one end and having a closure cap with an opening at the other end;

a piston slidably guided within the cylinder;

a piston rod extending from the piston outwardly of the cylinder through the opening of the closure cap;

an annular recess formed circumferentially on the piston;

an annular sealing ring placed in the recess and sealingly engaging an inner wall of the cylinder and a bottom of the recess; and a coil spring located between the closure cap and the piston;

wherein the piston rod has at least one elongated rib extending axially of the piston rod, the rib contacts at least one turn of the coil spring in a substantially force-free manner when the coil spring is in a relieved state.

7. The air damper of claim 6, wherein the coil spring comprises a necked down portion in a middle region thereof and the necked down portion is in contact with the rib in the relived state of the coil spring.

8. The air damper of claim 7, wherein the rib is resilient in a radial direction of the piston rod.

9. The air damper of claim 8, wherein the rib comprises an elongated channel extending through an entire thickness and longitudinally of the rib.

10. The air damper of claim 7, wherein the coil spring is formed symmetrically -With respect to the necked down portion.

11. The air damper of claim 6, wherein the coil spring is provided with a plastic coating.

12. The air damper of claim 11, wherein the coil spring is formed of a plastic coated spring wire.

13. The air damper of claim 6, wherein a dimension of the sealing ring as measured in a longitudinal direction of the cylinder is smaller than that of the recess.

14. The air damper of claim 13, further comprising an air passage communicating an upper side of the piston facing the closure cap with a lower side of the piston facing the closed end of cylinder.

15. The air damper of claim 14, wherein the sealing ring is generally rectangular in cross-section and made of a thermoplastic elastomer, the sealing ring being coated with a layer which has approximately equal static and sliding frictions with the inner wall of the cylinder and the bottom of the recess.

16. The air damper of claim 15, wherein said at least one rib comprises at least a pair of ribs arranged diametrically with respect to the piston rod.

17. The air damper of claim 6, wherein the coil spring and the rib are configured so that final turns of the coil spring at opposite ends thereof do not contact the rib at all times.

18. The air damper of claim 6, wherein the rib comprises first and second end regions facing the closed end and the closure cap, respectively, and a middle region disposed between the end regions;

a width of the rib in the second end region, as measured in a radial direction of the piston rod, reduces from the middle region towards the closure cap.

19. The air damper of claim 18, wherein the second end region extends for about one third an entire length of the rib as measured axially of the piston rod.

20. The air damper of claim 18, wherein a width of the rib in the first end region, as measured in the radial direction of the piston rod, reduces from the middle region towards the closed end.

21. An air damper, comprising:

a hollow cylinder closed at one end and having a closure cap with an opening at the other end;

a piston slidably guided within the cylinder;

a piston rod extending from the piston outwardly of the cylinder through the opening of the closure cap;

an annular recess formed circumferentially on the piston;

an annular sealing ring placed in the recess and sealingly engaging an inner wall of the cylinder and a bottom of the recess;

wherein the piston rod is generally H-shaped in cross-section having two side sections connected by a central section; and an inner edge of the opening of the closure cap is provided with resilient protrusions each being generally U-shaped in cross-section with two leg sections connected by a bottom section, each of the leg sections resiliently engaging an outer side of one of the side sections of the piston rod.

22. The air damper of claim 21, wherein each of the leg sections comprises a ball-shaped end resiliently engaging the outer side of the corresponding side section of the piston rod.

23. The air damper of claim 21, wherein a dimension of the sealing ring as measured in a longitudinal direction of the cylinder is smaller than that of the recess.

24. The air damper of claim 23, further comprising an air passage communicating an upper side of the piston facing the closure cap with a lower side of the piston facing the closed end of the cylinder.

25. The air damper of claim 24, wherein the sealing ring is generally rectangular in cross-section and made of a thermoplastic elastomer, the sealing ring being coated with a layer which has approximately equal static and sliding frictions with the inner wall of the cylinder and the bottom of the recess.

26. An air damper, comprising:

a hollow cylinder closed at one end and having a closure cap with an opening at the other end;

a piston slidably guided within the cylinder;

a piston rod extending from the piston outwardly of the cylinder through the opening of the closure cap;

an annular recess formed circumferentially on the piston;

an annular sealing ring placed in the recess and sealingly engaging an inner wall of the cylinder and a bottom of the recess;

wherein the bottom is inclined with respect to an axial direction of the cylinder;

the recess further comprises upper and lower side walls facing the closure cap and the closed end of the cylinder respectively, and extending from the bottom radially of the cylinder;

a dimension of the sealing ring as measured in the axial direction of the cylinder is smaller than that of the bottom of the recess; and a portion of the sealing ring adapted to contact the bottom of the recess does not conform in shape to the bottom so that contact forces between the sealing ring and the bottom of the recess and the inner wall of the cylinder change as the sealing ring moves between the side walls of the recess.

27. The air damper of claim 26, wherein said portion of the sealing ring is an inner cylindrical surface extending substantially in axial direction of the cylinder.

28. The air damper of claim 27, wherein a thickness of the sealing ring flares, at least partially, towards the upper side wall of the recess.

29. The air damper of claim 28, wherein an outer surface of the sealing ring includes a lower segment which is a cylindrical surface and an upper segment which is a truncated conical surface.

* * * * *